(12) United States Patent
Tsai

(10) Patent No.: US 8,106,643 B2
(45) Date of Patent: Jan. 31, 2012

(54) POWER SUPPLY APPARATUS

(75) Inventor: Chih-Chang Tsai, Taoyuan County (TW)

(73) Assignees: FSP Technology Inc., Taoyuan County (TW); 3Y Power Technology (Taiwan), Inc., Taoyuan County (TW)

(*) Notice: Subject to any disclaimer, the term of this patent is extended or adjusted under 35 U.S.C. 154(b) by 181 days.

(21) Appl. No.: 12/727,252

(22) Filed: Mar. 19, 2010

(65) Prior Publication Data
US 2011/0227413 A1 Sep. 22, 2011

(51) Int. Cl.
*G05F 1/575* (2006.01)
*G05F 1/59* (2006.01)
(52) U.S. Cl. ......................... 323/285; 323/271
(58) Field of Classification Search .................. 323/222, 323/223, 266, 268, 271, 272, 282, 284, 285, 323/351
See application file for complete search history.

(56) References Cited

U.S. PATENT DOCUMENTS

| | | | | |
|---|---|---|---|---|
| 6,229,291 B1* | 5/2001 | Matsumura et al. | ........... | 323/282 |
| 6,800,962 B2* | 10/2004 | Bahl et al. | ................. | 307/52 |
| 7,148,665 B2* | 12/2006 | Agari et al. | ................. | 323/268 |
| 7,298,601 B2* | 11/2007 | Covi et al. | ................. | 361/56 |
| 7,965,071 B2* | 6/2011 | Saitoh | ................. | 323/288 |

* cited by examiner

*Primary Examiner* — Gary L Laxton
(74) *Attorney, Agent, or Firm* — Jianq Chyun IP Office

(57) ABSTRACT

A power supply apparatus is provided. The power supply apparatus includes two power suppliers coupled in parallel so as to simultaneously supply the electric power required by an electronic product in operation. The power supply apparatus provided by the invention may stably/accurately output the desired DC output voltage to the electronic product, and may further in advance increase a main power generated inside the other power supplier when one of the power suppliers is over voltage, thereby avoiding an oversized voltage drop from occurring in the DC output voltage.

10 Claims, 3 Drawing Sheets

POWER SUPPLY APPARATUS

BACKGROUND

1. Technical Field

The invention generally relates to a power supply apparatus, and more particularly, to a power supply apparatus having an external over voltage compensation and/or a voltage-difference detection for performing feedback compensation.

2. Related Art

In applications of several high-end electronic products (such as a server or an industrial computer), two power suppliers with the same specification and having negative feedback control functionality are usually coupled in parallel, so as to simultaneously provide the required electric power to the electronic product in operation. When one of the power suppliers is not functioning due to over voltage, the other power supplier is utilized to continue supplying the electric power to the electronic product.

In practice, when one of the power suppliers is over voltage, or the feedbacks of both power suppliers have a deviation, due to the negative feedback control, a duty cycle of the control signal generated by the voltage feedback controller inside the said one will be correspondingly decreased. However, when the duty cycle of the control signal is decreased to a limit, the power supplier may no longer be functioning. At this time, due to the load of the other power supplier is increased drastically, there is likely an oversized voltage drop occurring in the electric power provided by such power supplier. If the electric power suddenly drops below the minimum power specification of the electronic product, it may cause the electronic product switch off without any warning, or cause the system of the electronic product very unstable.

SUMMARY

Accordingly, the invention is direct to a power supply apparatus which may solve problems regarding the prior arts.

Other objectives and advantages of the invention can be further understood from technical features disclosed in the invention.

In order to achieve one of, a portion of or all of objectives or other objectives, the power supply apparatus provided by the invention includes a first power supplier receiving a direct current (DC) input voltage and generating a DC output voltage accordingly. The first power supplier includes a main power generating unit, an isolation diode, a first resistor, a voltage feedback controller and an over voltage detecting unit, where the main power generating unit receives and converts the DC input voltage so as to generate a main power accordingly. The isolation diode is coupled to the main power generating unit, and has an anode receiving the main power and a cathode outputting the DC output voltage.

A first terminal of the first resistor is coupled to the anode of the isolation diode. The voltage feedback controller is coupled to a second terminal of the first resistor and the main power generating unit, and provides a control signal to control the main power generating unit according to a voltage of the second terminal of the first resistor and thus regulate the main power. The voltage difference detecting unit is coupled to the cathode of the isolation diode and a second terminal of the first resistor, and compares a voltage of the cathode of the isolation diode with a voltage of the second terminal of the first resistor, so as to control the voltage of the second terminal of the first resistor always equal to the voltage of the cathode of isolation diode, and thus making the first power supplier stably output the DC output voltage.

In an embodiment of the invention, the power supply apparatus further includes a second power supplier receiving the DC input voltage and generating the DC output voltage accordingly, where the DC output voltages respectively generated by the first power supplier and the second power supplier are simultaneously provided to a load. In such a condition, the first power supplier further includes an over voltage detecting unit, which is coupled to the cathode of the isolation diode and the second terminal of the first resistor, and used for pulling down the voltage of the second terminal of the first resistor when the second power supplier is over voltage, so as to increase a duty cycle of the control signal and thus increasing the main power.

In view of the above, the power supply apparatus proposed by the invention utilizes the voltage difference detecting unit to control the voltage of the second terminal of the first resistor always equal to the voltage of the cathode of the isolation diode, and thereby making the first power supplier stably/accurately output the desired DC output voltage to the load (e.g., a high-end electronic product such as a sever, an industrial computer and so forth). Besides, the power supply apparatus proposed by the invention further utilizes the over voltage detecting unit to increase the main power (generated by the main power generating unit of the first power supplier) in advance, so as to avoid an oversized voltage drop from occurring in the DC output voltage generated by the first power supplier when the load is increased drastically (i.e., when the second power supplier is not functioning due to the over voltage) and thereby ensuring the DC output voltage not lower than the minimum power specification of the electronic product.

It is to be understood that both the foregoing general description and the following detailed description are exemplary, and are further intended to provide the explanation of the present disclosure as claimed.

BRIEF DESCRIPTION OF THE DRAWINGS

The accompanying drawings are included to provide a further understanding of the invention, and are incorporated in and constitute a part of this specification. The drawings illustrate embodiments of the invention and serve to explain the principles of the invention together with the description.

DESCRIPTION OF THE EXEMPLARY EMBODIMENTS

Figure 1:
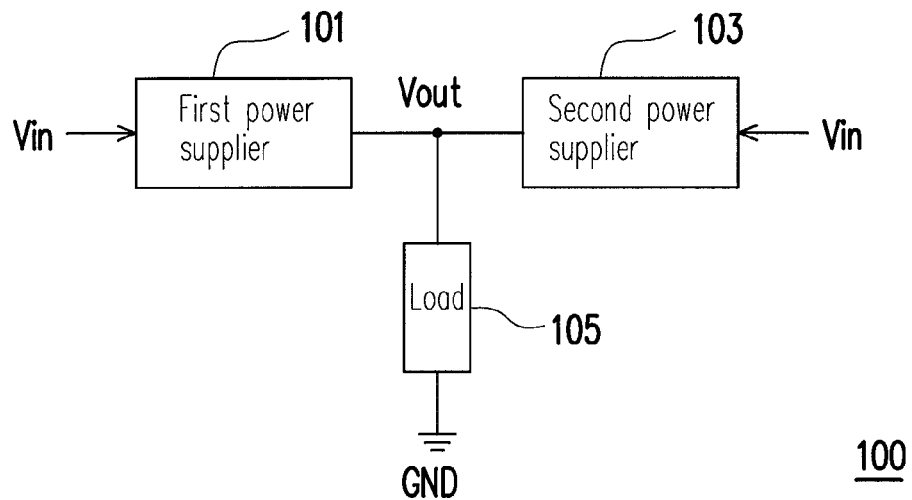
FIG. 1 is a schematic diagram illustrating a power supply apparatus of an embodiment of the invention.

Reference will now be made in detail to the exemplary embodiments of the invention, examples of which are illustrated in the accompanying drawings. Wherever possible, the same reference numbers are used in the drawings and the description to refer to the same or like parts.

FIG. 1 is a schematic diagram illustrating a power supply apparatus 100 of an embodiment of the invention. Referring to FIG. 1, the power supply apparatus 100 includes two power suppliers 101 and 103, where the power supplier 101 and the power supplier 103 both have negative feedback control functionality. In the present embodiment, the first power supplier 101 and the second power supplier 103 are coupled in parallel, and respectively receive a DC input voltage Vin and generates a DC output voltage Vout accordingly to a load 105 (e.g., a server, but not limited thereto, and the load 105 is hereinafter referred to as a server 105). In other words, the first power supplier 101 and the second power supplier 103 simultaneously supply the required electric power to the server 105 in operation.

As known in the disclosures of the related arts, when the second power supplier 103 is over voltage or the feedbacks of both power suppliers 101 and 103 have a deviation (the reason causing this situation may be deviations of internal feedback components of the two power suppliers 101 and 103, and the deviations are deviations between resistances of resistors), a duty cycle of a control signal generated by a voltage feedback controller (not illustrated) inside the second voltage supplier 103 may be decreased correspondingly due to the negative feedback control. However, under a condition when the duty cycle is decreased to a limit, the second power supplier 103 may no longer be functioning. In the present embodiment, although the load of the first power supplier 101 is increased drastically at this time, there is no oversized voltage drop in the DC output voltage Vout generated by the first power supplier 101 and the DC output voltage Vout is still maintained above the minimum power specification of the server 105. Accordingly, the present embodiment then solves the problems mentioned in the related arts.

Figure 2:
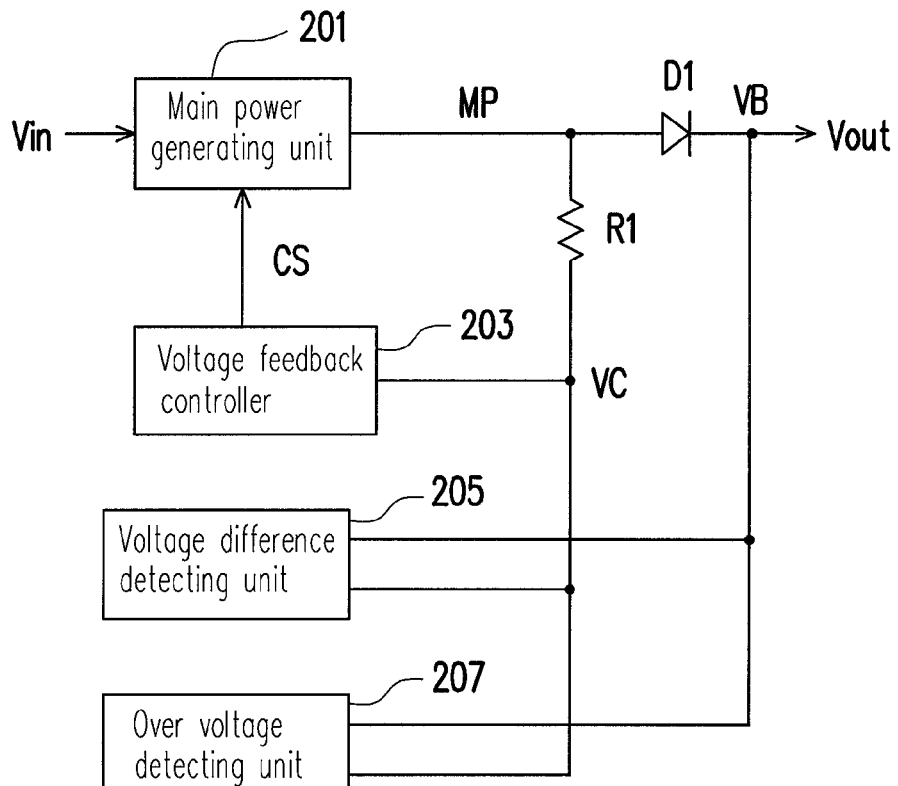
FIG. 2 is a block diagram illustrating a first power supplier of an embodiment of the invention.
Figure 3:
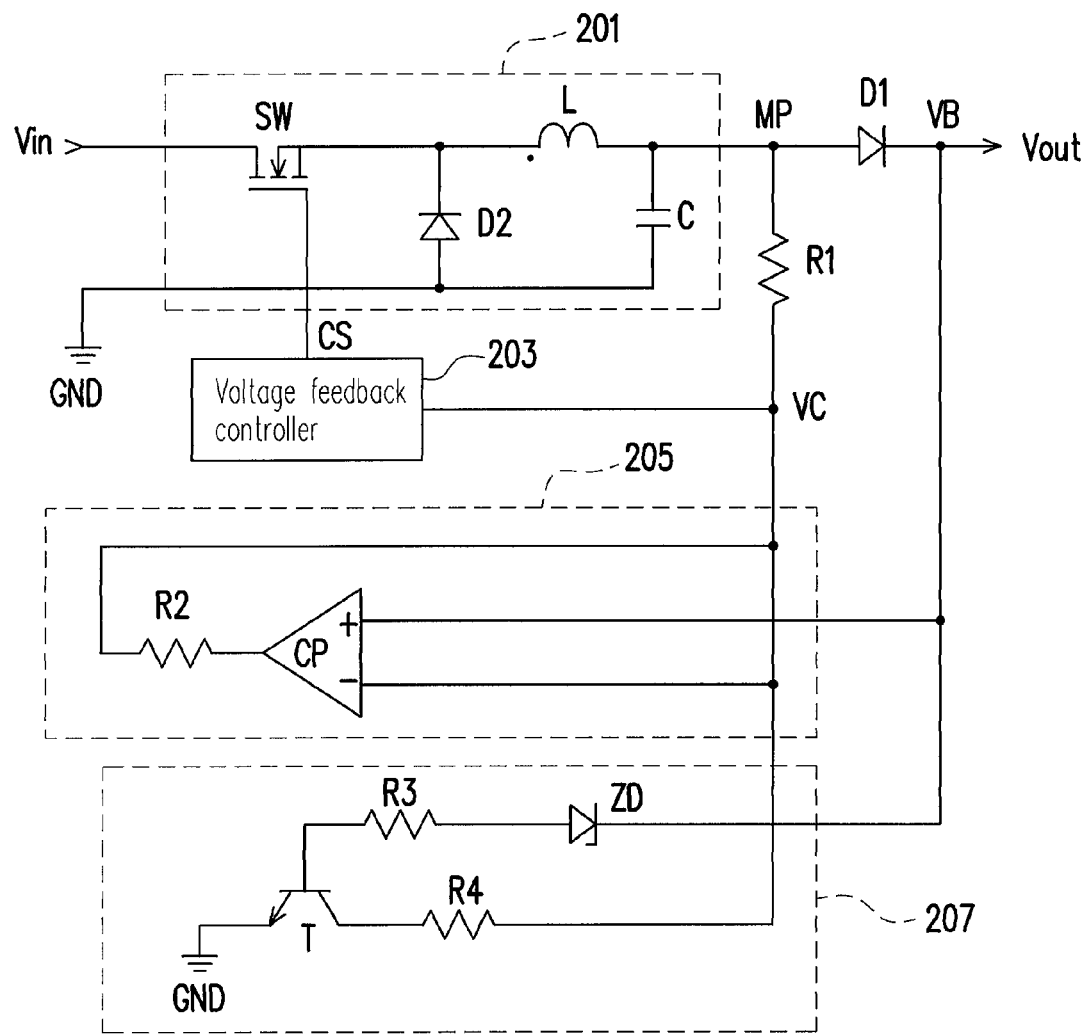
FIG. 3 is an electric circuit diagram illustrating a first power supplier of an embodiment of the invention.

To be more specific, FIG. 2 is a block diagram illustrating the first power supplier 101 of an embodiment of the invention; and FIG. 3 is an electric circuit diagram illustrating the first power supplier 101 of an embodiment of the invention. Referring to FIG. 1 to FIG. 3, the first power supplier 101 includes a main power generating unit 201, an isolation diode D1, a first resistor R1, a voltage feedback controller 203, a voltage difference detecting unit 205 and an over voltage detecting unit 207.

In the present embodiment, the main power generating unit 201 is a DC-to-DC converter, such as a buck converter, but not limited thereto, and the main power generating unit 201 may be other isolation type boost converter and/or buck converter, or a non-isolation type boost converter and/or buck converter. The main power generating unit 201 is configured to receive and convert the DC input voltage Vin so as to generate a main power MP accordingly.

The isolation diode D1 is coupled to the main power generating unit 201, and has an anode receiving the main power MP and a cathode outputting the DC output voltage Vout. A first terminal of the first resistor R1 is coupled to the anode of the isolation diode D1. The voltage feedback controller 203 is coupled to a second terminal of the first resistor R1 and the main power generating unit 201, and is configured to provide a control signal CS so as to control the main power generating unit 201 according to a voltage VC of the second terminal of the first resistor R1, and thereby regulating (e.g., increasing or decreasing) the main power MP.

It is to be noted that, in other embodiments of the invention, a parasitic diode of a metal-oxide-semiconductor field effect transistor (hereinafter abbreviated as MOSFET) may be utilized to realize the effects of the isolation diode D1. Accordingly, a control mechanism is just required to be allocated in the power supply apparatus 101 so as to control a switching-on or a switching-off of the MOSFET.

The voltage difference detecting unit 205 is coupled to the cathode of the isolation diode D1 and the second terminal of the first resistor R1, and compares a voltage VB of the cathode of the isolation diode D1 with a voltage VC of the second terminal of the first resistor R1, so as to control the voltage VC of the second terminal of the first resistor R1 always equal to the voltage VB of the cathode of the isolation diode D1 accordingly, and thereby making the first power supply apparatus 101 stably/accurately output the DC output voltage Vout. The over voltage detecting unit 207 is coupled to the cathode of the isolation diode D1 and the second terminal of the first resistor R1, and is configured to pull down the voltage VC of the second terminal of the first resistor R1 when the second power supplier 103 is over voltage, so as to increase a duty cycle of the control signal CS, and thereby increasing the main power MP.

In the present embodiment, the main power generating unit 201 includes a switch SW, a diode D2, an inductor L and a capacitor C, where the switch SW may be realized by a MOS transistor and has a first terminal receiving the DC input voltage Vin and a control terminal receiving the control signal CS. An anode of the diode D2 is coupled to a ground potential GND, and a cathode of the diode D2 is coupled to a second terminal of the switch SW. A first terminal of the inductor L is coupled to the second terminal of the switch SW, and a second terminal of the inductor L is coupled to the first terminal of the first resistor R1 to generate the main power MP. A first terminal of the capacitor C is coupled to the second terminal of the inductor L, and a second terminal of the capacitor C is coupled to the ground potential GND.

The voltage difference detecting unit 205 includes a comparator CP and a second resistor R2, where a positive input terminal (+) of the comparator CP is coupled to the cathode of the isolation diode D1, and a negative input terminal (−) of the comparator CP is coupled to the second terminal of the first resistor R1. A first terminal of the second resistor R2 is coupled to an output terminal of the comparator CP, and a second terminal of the second resistor R2 is coupled to the second terminal of the first resistor R1.

The over voltage detecting unit 207 includes a Zener diode ZD, a third resistor R3, an NPN type bipolar junction transistor (BJT) T and a fourth resistor R4, where a cathode of the Zener diode ZD is coupled to the cathode of the isolation diode D1. A first terminal of the third resistor R3 is coupled to an anode of the Zener diode ZD. A base of the NPN type BJT T is coupled to a second terminal of the third resistor R3, and an emitter of the NPN type BJT T is coupled to the ground potential GND. A first terminal of the fourth resistor R4 is coupled to the second terminal of the first resistor R1, and a second terminal of the fourth resistor R4 is coupled to a collector of the NPN type BJT T.

In the present embodiment, if the second voltage supplier 103 is over voltage, the Zener diode ZD is conducted. In other words, the Zener diode ZD of the present embodiment is just conducted when the second power supplier 103 is over voltage. At this time, due to the NPN type BJT T being also conducted, the voltage VC of the second terminal of first transistor R1 is pulled down, so as to increase the duty cycle of the control signal CS provided by the voltage feedback controller 203, and thereby increasing the man power MP generated by the main power generating unit 201.

Also due to the aforementioned reasons, when the second power supplier 103 is not functioning due to over voltage, there will not be an oversized voltage drop occurring in the DC output voltage Vout generated by the first power supplier 101 due to the load being increased drastically (because the main power MP generated by the main power generating unit 201 is increased in advance before the second power supplier 103 is not functioning), so as to make the DC output voltage Vout generated at this instant by the first power supplier 101 maintained not lower than the minimum power specification of the server 105, and thereby avoiding/preventing the server 105 from a power-off incidence without any warning, or avoiding/preventing the server 105 from an unstable situation.

On the other hand, in order to make the first power supplier 101 stably/accurately output the DC output voltage Vout to the server 105, when an output current of the first power supplier 101 is increased (i.e., when the load is increased), the voltage VB of the cathode of the isolation diode D1 is also decreased correspondingly. However, since the comparator CP compares the voltage CB of the cathode of the isolation diode D1 with the voltage VC of the second terminal of the first resistor R1, such that when the voltage VB of the cathode of the isolation diode D1 is decreased, the output terminal of the comparator CP pulls down the voltage VC of the second terminal of the first resistor R1, so as to make the voltage VC of the second terminal of the first resistor R1 always equal to the voltage VB of the cathode of the isolation diode D1, i.e., VB=VC.

Accordingly, due to the reference basis (i.e., the voltage VC of the second terminal of the first resistor R1) used by the voltage feedback controller 203 to regulate the main power MP is always equal to the voltage VB (i.e., the DC output voltage Vout) of the cathode of the isolation diode D1, the first power supplier 101 may stably/accurately output the desired DC output voltage Vout to the server 105. In addition, when the voltage VB of the cathode of the isolation diode D1 is too high, the voltage VB may also be isolated by the comparator CP, so as to avoid the too high DC output voltage Vout returning back into the first power supplier 101.

As can be understood from the above descriptions, the present embodiment utilizes the voltage difference detecting unit 205 to control the voltage VC of the second terminal of the first resistor R1 always equal to the voltage VB of the cathode of the isolation diode D1, so as to make the first power supplier 101 stably/accurately output the desired DC output voltage Vout to the server 105. Besides, the present embodiment further utilizes the over voltage detecting unit 207 to increase the main power MP (generated by the main power generating unit 201 of the first power supplier 101) in advance, so as to avoid an oversized voltage drop from occurring in the DC output voltage Vout generated by the first power supplier 101 due to the load being increased drastically (i.e., when the second power supplier 103 is not functioning due to over voltage), and thus ensuring the DC output voltage Vout not lower than the power specification of the server 105.

Figure 4:
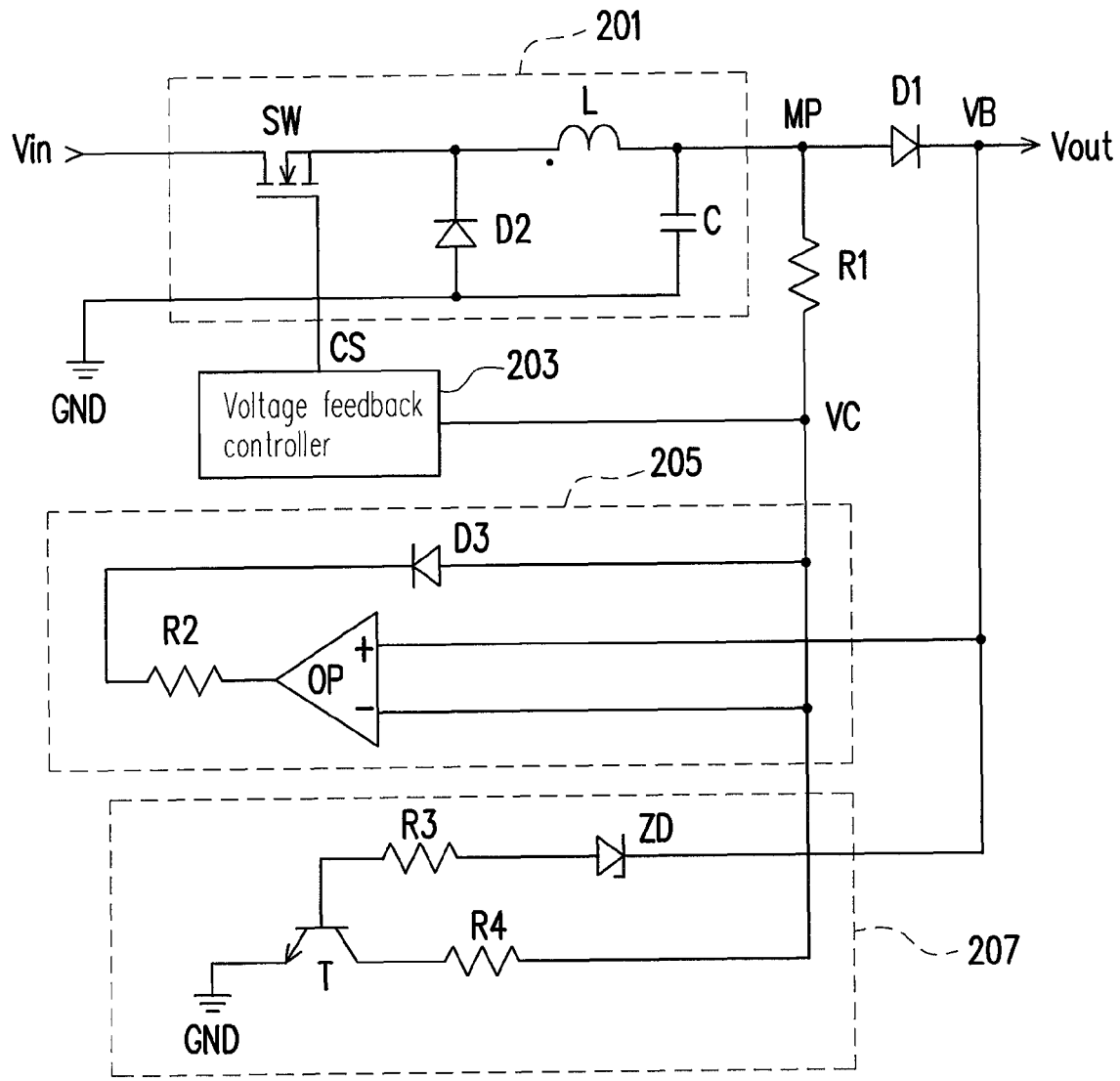
FIG. 4 is an electric circuit diagram illustrating a first power supplier of another embodiment of the invention.

FIG. 4 is an electric circuit diagram illustrating a first power supplier of another embodiment of the invention. Referring to both FIG. 3 and FIG. 4, a difference between FIG. 3 and FIG. 4 lies in that the voltage difference detecting unit 205 of FIG. 4 is realized by using an operational amplifier OP, the second resistor R2 and the diode D3, where a positive input terminal (+) of the operational amplifier OP is coupled to the cathode of the isolation diode D1 and a negative input terminal (−) of the operational amplifier OP is coupled to the second terminal of the first resistor R1. The first terminal of the second resistor R2 is coupled to an output terminal of the operational amplifier OP. An anode of the diode D3 is coupled to the second terminal of the first resistor R1, and a cathode of the diode D3 is coupled to the second terminal of the second resistor R2.

In the present embodiment, due to an output stage structure of the operational amplifier OP being different from an output stage structure of the comparator CP, a diode D3 is further required to be allocated in the voltage difference detecting unit 205 of FIG. 4, so as to avoid an oversized DC output voltage Vout returning back into the first power amplifier 101. An overall operation of the first power supplier 101 of FIG. 4 is not described herein since it is substantially similar to that of the first power supplier 101 of FIG. 3.

In summary, the power supply apparatuses proposed by the invention utilize the voltage difference detecting unit to control the voltage of the second terminal of the first resistor always equal to the voltage of the cathode of the diode, so as to make the first power supplier stably/accurately output the desired DC output voltage to the load (e.g., a high-end electronic product such as a server, an industrial computer and so fourth). Besides, the power supply apparatuses proposed by the invention further utilize the over voltage detecting unit to increase the main power (generated by the main power generating unit of the first power supplier) in advance when the second power supplier is over voltage, so as to avoid an oversized voltage drop from occurring in the DC output voltage generated by the first power supplier due to the load being increased drastically (i.e., the second power supplier is not functioning due to over voltage), and thus ensuring the DC output voltage not lower than the minimum power specification of the electronic product.

It will be apparent to those skilled in the art that various modifications and variations of the exemplary embodiments can be made to the structure of the invention without departing from the scope or spirit of the invention. In view of the foregoing descriptions, it is intended that the present disclosure covers modifications and variations of the exemplary embodiments if they fall within the scope of the following claims and their equivalents.

What is claimed is:

1. A power supply apparatus, comprising:
a first power supplier, configured for receiving a direct current (DC) input voltage and generating a DC output voltage accordingly, the first power supplier comprising:
a main power generating unit, configured for receiving and converting the DC input voltage so as to generate a main power accordingly;
an isolation diode, coupled to the main power generating unit, the isolation diode having an anode receiving the main power and a cathode outputting the DC output voltage;
a first resistor having a first terminal coupled to the anode of the isolation diode;
a voltage feedback controller, coupled to a second terminal of the first resistor and the main power generating unit, configured for providing a control signal to control the main power generating unit according to a voltage of the second terminal of the first resistor, so as to regulate the main power; and
a voltage difference detecting unit, coupled to the cathode of the isolation diode and the second terminal of the first resistor, configured for comparing a voltage of the cathode of the isolation diode with a voltage of the second terminal of the first resistor, so as to control the voltage of the second terminal of the first resistor always equal to the voltage of the cathode of the isolation diode, and thus making the first power supplier stably output the DC output voltage.

2. The power supply apparatus according to claim 1, further comprising:
a second power supplier, configured for receiving the DC input voltage and generating the DC output voltage accordingly,
wherein the DC output voltages respectively generated by the first power supplier and the second power supplier are simultaneously provided to a load.

3. The power supply apparatus according to claim 2, wherein the first power supplier further comprising:

an over voltage detecting unit, coupled to the cathode of the isolation diode and the second terminal of the first resistor, configured for pulling down the voltage of the second terminal of the first resistor when the second power supplier is over voltage, so as to increase a duty cycle of the control signal and thus increasing the main power.

4. The power supply apparatus according to claim 3, wherein the voltage difference detecting unit comprises:
   a comparator having a positive input terminal coupled to the cathode of the isolation diode and a negative input terminal coupled to the second terminal of the first resistor; and
   a second resistor having a first terminal coupled to an output terminal of the comparator and a second terminal coupled to the second terminal of the first resistor.

5. The power supply apparatus according to claim 3, wherein the voltage difference detecting unit comprises:
   an operational amplifier having a positive input terminal coupled to the cathode of the diode and a negative input terminal coupled to the second terminal of the first resistor;
   a second resistor having a first terminal coupled to an output terminal of the operational amplifier; and
   a diode having an anode coupled to the second terminal of the first resistor and a cathode coupled to a second terminal of the second resistor.

6. The power supply apparatus according to claim 3, wherein the over voltage detecting unit comprises:
   a Zener diode having a cathode coupled to the cathode of the isolation diode;
   a third resistor having a first terminal coupled to an anode of the Zener diode;
   a bipolar junction transistor (BJT) having a base coupled to a second terminal of the third resistor and an emitter coupled to a ground potential; and
   a fourth resistor having a first terminal coupled to the second terminal of the first resistor and a second terminal coupled to a collector of the BJT.

7. The power supply apparatus according to claim 6, wherein the BJT is an NPN type BJT.

8. The power supply apparatus according to claim 1, wherein the main power generating unit comprises:
   a switch having a first terminal receiving the DC input voltage and a control terminal receiving the control signal;
   a diode having an anode coupled to a ground potential and a cathode coupled to a second terminal of the switch;
   an inductor having a first terminal coupled to the second terminal of the switch and a second terminal coupled to the first terminal of the first resistor for generating the main power; and
   a capacitor having a first terminal coupled to the second terminal of the inductor and a second terminal coupled to the ground potential.

9. The power supply apparatus according to claim 8, wherein the main power generating unit is a DC-to-DC converter.

10. The power supply apparatus according to claim 8, wherein the DC-to-DC converter comprises an isolation type boost converter and/or buck converter, or a non-isolation type boost converter and/or buck converter.

* * * * *